United States Patent [19]
Huang

[11] Patent Number: 5,668,748
[45] Date of Patent: Sep. 16, 1997

[54] APPARATUS FOR TWO-DIMENSIONAL DISCRETE COSINE TRANSFORM

[75] Inventor: Po-Chuan Huang, Hsinchu, Taiwan

[73] Assignee: United Microelectronics Corporation, Taiwan

[21] Appl. No.: 493,897

[22] Filed: Jun. 23, 1995

[51] Int. Cl.⁶ .................................................. G06F 17/14
[52] U.S. Cl. ..................... 364/725.03; 382/248; 382/250
[58] Field of Search .................................. 364/725, 726, 364/727, 754, 768; 382/248, 250

[56] References Cited

U.S. PATENT DOCUMENTS

| | | | |
|---|---|---|---|
| 5,257,213 | 10/1993 | Kim et al. | 364/725 |
| 5,343,501 | 8/1994 | Kadono et al. | 364/726 |
| 5,483,475 | 1/1996 | Kao | 364/725 |
| 5,528,528 | 6/1996 | Bui | 364/725 |

Primary Examiner—Reba I. Elmore
Assistant Examiner—Emmanuel L. Moise
Attorney, Agent, or Firm—Cushman Darby & Cushman IP Group of Pillsbury Madison & Sutro LLP

[57] ABSTRACT

An apparatus for real time 2-D DCT comprises a rate buffer, a pair of multiplexers, a plurality of registers, a plurality of summing elements, a plurality of parameter extractors, a plurality of accumulators, a pair of truncators, a transpose buffer and an inverse rate buffer. In the present invention, data input rate of the rate buffer and output rate of the inverse rate buffer are a first rate, while the transform process, which is carried out between the rate buffer and the inverse rate buffer, is at a second rate. Moreover, a distributed arithmetic structure is utilized in the invention to decrease the circuit complexity and increase the operating efficiency. Therefore, real time 2-D DCT can be achieved by the apparatus of the present invention.

11 Claims, 4 Drawing Sheets

APPARATUS FOR TWO-DIMENSIONAL DISCRETE COSINE TRANSFORM

BACKGROUND OF THE INVENTION

1. Field of Invention

The present invention relates to an apparatus for digital signal processing, and more specifically, to an apparatus for real time two-dimensional discrete cosine transform (DCT) suitable for implementing into a very large scale integrated (VLSI) circuit.

2. Description of Related Art

In order to implement a number of international video standards, such as Joint Photographic Experts Group (JPEG), Motion Picture Experts Group (MPEG) and H.261, a circuit for fast video data coding or compressing is required. How to increase data transformation efficiency during data coding or compressing has become the most important issue. Since the Discrete Cosine Transform (DCT) process is one of orthogonal transform techniques which have higher transformation efficiency, it has been widely used in video systems for data coding.

Even though efforts have been made to simplify the DCT algorithm, a conventional DCT circuit is still very complicated. In addition, the efficiency that can be obtained from conventional circuits is insufficient to satisfy the requirements of a real time DCT. Conventional circuits are not properly designed to achieve the desired result. For instance, in order to reduce the circuit dimension, methods such as data feedback may be adopted in the circuit design, thus increasing executing time of data transformation. Without skillful arrangement of data flow or timing relationships, operation rates of the DCT circuit will be too low to conform the requirements of the aforementioned international standards.

Furthermore, because multipliers which have very low operating rates are utilized in the conventional DCT circuit, the transformation efficiency of the DCT circuit is affected. Thus, real time operation is difficult to achieve. Though read-only-memory (ROM) devices can take the place of the multipliers of the DCT circuit to increase the efficiency, the ROM devices with very large capacity are required for the 2-D transformation. Therefore, the circuit dimension will be too large to satisfy the requirement of a VLSI circuit.

SUMMARY OF THE INVENTION

Accordingly, the present invention provides a two-dimensional (2-D) DCT circuit having a distributed arithmetic structure, so as to reduce the circuit complexity and increase transformation efficiency.

The present invention also provides a 2-D DCT circuit comprising elements operated at various rates for high speed data transformation thus achieving the real time requirement.

The present invention further provides a 2-D DCT circuit having specific data flow and timing, thus decreasing the circuit dimension and facilitating its implementation into a VLSI circuit.

An apparatus for real time 2-D DCT according to the present invention comprises a rate buffer, a pair of multiplexers, a plurality of registers, a plurality of summing elements, a plurality of parameter extractors, a plurality of accumulators, a pair of truncators, a transpose buffer and an inverse rate buffer.

In the present invention, data input rate of the rate buffer and output rate of the inverse rate buffer are a first rate, while the transform process, which is carried out between the rate buffer and the inverse rate buffer, is at a second rate. Moreover, a distributed arithmetic structure is utilized to decrease the circuit complexity and increase the operating efficiency. Therefore, real time 2-D DCT can be achieved by the apparatus of the present invention.

DETAILED DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE PRESENTLY PREFERRED EMBODIMENTS

Figure 1:
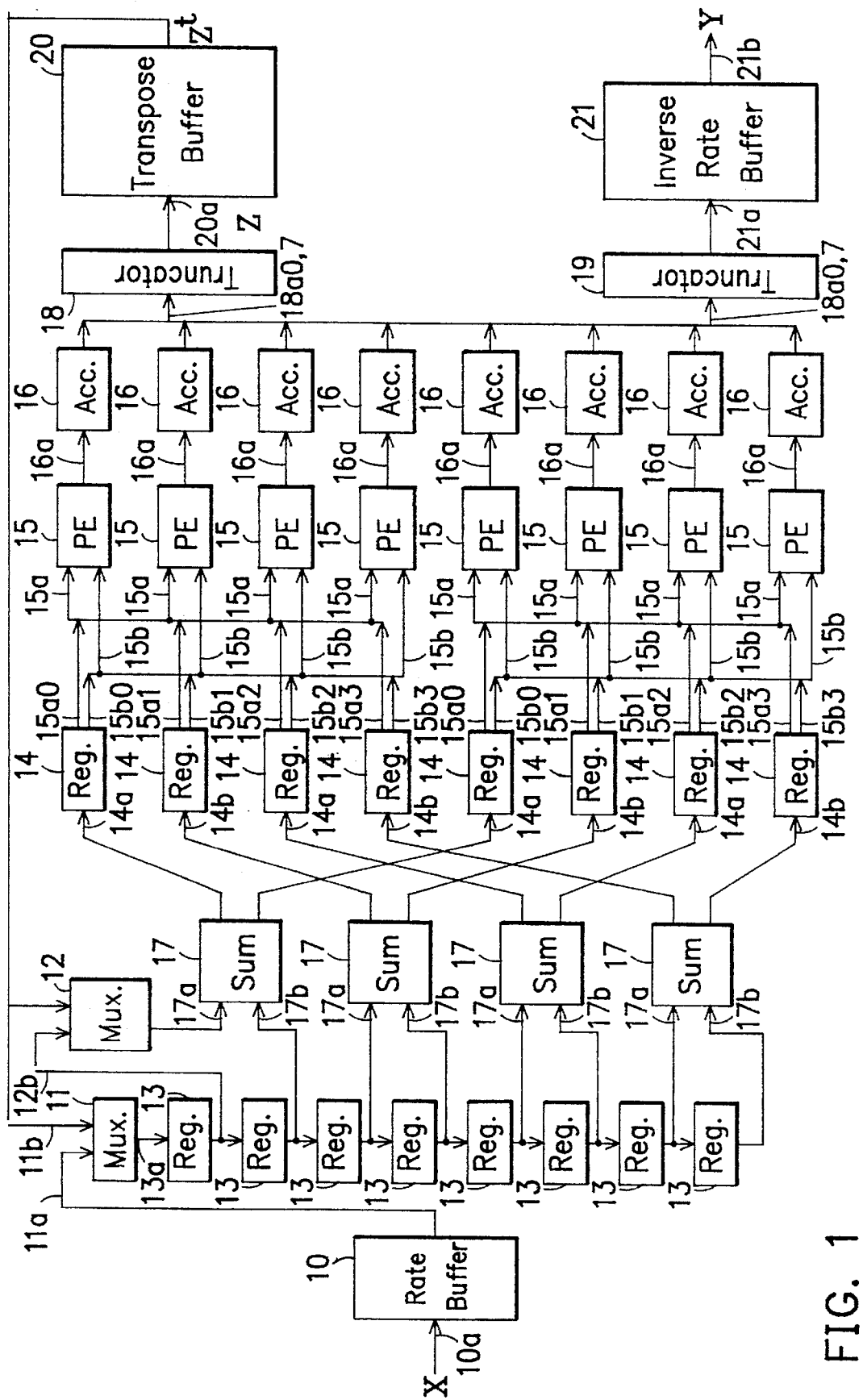
FIG. 1 is a block diagram of a 2-D DCT circuit according to the present invention.

Prior to describing the DCT circuit of a preferred embodiment of the invention, the DCT algorithm will be explained. For the purpose of easy explanation only, we take as an example a data matrix having a dimension of 8×8. If an input data matrix $\underline{X}$ of the DCT circuit has elements $X_{ij}$ which will be transformed into $Y_{UV}$ and thus composing an output matrix $\underline{Y}$, the transformation equation can be expressed as Eq. (1).

$$Y_{uv} = \frac{1}{4} \sum_{i=0}^{7} \sum_{j=0}^{7} C(u)C(v)\cos\frac{(2i+1)u\pi}{16} \cos\frac{(2j+1)v\pi}{16} X_{ij}, \quad (1)$$

where parameters C (u) and C (v) are $$C(u), C(v) = \begin{cases} \frac{1}{\sqrt{2}}, & (u,v=0) \\ 1, & (u,v \neq 0) \end{cases}, \text{respectively.} \quad (2)$$

In general, the expression of Eq. (1) can be rearranged into Eq. (3) to simplify the calculation.

$$Y_{uv} = \frac{1}{2} \sum_{j=0}^{7} C(v)\cos\frac{(2j+1)v\pi}{16} \left[ \frac{1}{2} \sum_{i=0}^{7} C(u)\cos\frac{(2i+1)u\pi}{16} X_{ij} \right] \quad (3)$$

That is, the direct 2-D algorithm of Eq. (1) is reduced to the double 1-D processes of Eq. (3).

Therefore, the DCT equation can be expanded into matrix expression, as is shown in Eq. (4), which can more properly describe the row and column calculation in an DCT process.

$$\begin{bmatrix} y_0 \\ y_2 \\ y_4 \\ y_6 \\ y_1 \\ y_3 \\ y_5 \\ y_7 \end{bmatrix} = \begin{bmatrix} A & A & A & A & A & A & A & A \\ B & C & -C & -B & -B & -C & -C & B \\ A & -A & -A & A & A & -A & -A & A \\ C & -B & B & -C & -C & B & -B & C \\ D & B & F & G & -G & -F & -E & -D \\ E & -G & -D & -F & F & D & G & -E \\ F & -D & G & E & E & -G & D & -F \\ G & -F & E & -D & D & -E & F & -G \end{bmatrix} \begin{bmatrix} x_0 \\ x_2 \\ x_4 \\ x_6 \\ x_1 \\ x_3 \\ x_5 \\ x_7 \end{bmatrix} \quad (4)$$

with elements of:

$$A = \frac{1}{2}\cos\frac{\pi}{4}, B = \frac{1}{2}\cos\frac{\pi}{8}, C = \frac{1}{2}\sin\frac{\pi}{8},$$

$$D = \frac{1}{2}\cos\frac{\pi}{16}, E = \frac{1}{2}\cos\frac{3\pi}{16},$$

$$F = \frac{1}{2}\sin\frac{3\pi}{16}, G = \frac{1}{2}\sin\frac{\pi}{16}$$

Because of its symmetrical properties, the dimension of the 8×8 matrix in Eq. (4) can be further reduced. Therefore, much simplified expressions of the DCT process which include calculation of 4×4 matrices are shown in Eqs. (5) and (6).

$$\begin{bmatrix} y_0 \\ y_2 \\ y_4 \\ y_6 \end{bmatrix} = \begin{bmatrix} A & A & A & A \\ B & C & -C & -B \\ A & -A & -A & A \\ C & -B & B & -C \end{bmatrix} \begin{bmatrix} x_0 + x_7 \\ x_1 + x_6 \\ x_2 + x_5 \\ x_3 + x_4 \end{bmatrix} \quad (5)$$

$$\begin{bmatrix} y_1 \\ y_3 \\ y_5 \\ y_7 \end{bmatrix} = \begin{bmatrix} D & E & F & G \\ E & -G & -D & -F \\ F & -D & G & E \\ G & -F & E & -D \end{bmatrix} \begin{bmatrix} x_0 - x_7 \\ x_1 - x_6 \\ x_2 - x_5 \\ x_3 - x_4 \end{bmatrix} \quad (6)$$

Obviously, there are only two different multiplication's of matrices in Eqs. (5) and (6).

Because the operation of multipliers is too slow for the matrix calculation, the present invention uses ROM devices for DCT parameter extraction, thus facilitating matrix calculation. The present invention utilizes a distributed arithmetic structure to realize the above-mentioned calculation. The distributed arithmetic structure can reduce the capacity requirements of the ROM devices. Eq. (7) is a multiplying calculation of 4×4 matrices.

$$\begin{bmatrix} O_0 \\ O_1 \\ O_2 \\ O_3 \end{bmatrix} = \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \begin{bmatrix} I_0 \\ I_1 \\ I_2 \\ I_3 \end{bmatrix} \quad (7)$$

where parameters C, I and O have m, n and m+n bits, respectively. Therefore, Eq. (7) can be rewritten as $$O_i = \sum_{j=0}^{3} C_{ij} I_j, \text{ for } i = 0, \ldots, 3 \quad (8)$$

Further, if $I_j$ is represented as its 2's complement, i.e., $$I_j = -I_{j0} + \sum_{k=1}^{n-1} I_{jk} 2^{-k} \quad (9)$$

where $I_{j0}$ is sign bit and $I_0$ is the most significant bit (MSB), Eq. (8) can be represented as $$O_i = \sum_{j=0}^{3} C_{ij}\left(-I_{j0} + \sum_{k=1}^{n-1} I_{jk} 2^{-k}\right) = \sum_{j=0}^{3} C_{ij}(-I_{j0}) + \sum_{k=1}^{n-1}\left[\sum_{j=0}^{3} C_{ij} I_{jk} 2^{-k}\right] \quad (10)$$

The last term of Eq. (10) is calculated by selecting values of $C_{i0}$ through $C_{i3}$, based on the weighting of parameters $I_0$ through $I_3$. For example, when k=4 and $I_{04}I_{14}I_{24}I_{34}$=1011, the value of the last term of Eq. (10) will be $C_{i0}+C_{i2}+C_{i3}$. Therefore, if the values of $I_{0k}I_{1k}I_{2k}I_{3k}$ have been decided, the value of the last term of Eq. (10) can be obtained from a 16-word ROM device where predetermined values of $C_{i0}I_{0k}+C_{i1}I_{1k}+C_{i2}I_{2k}+C_{i3}I_{3k}$ are stored. In the present invention, each word of the ROM device consists of m+n bits. Thus, the calculation of Eq. (10) can be carried out by n-multiple accumulation of results from the 16-word ROM device and a (m+n)-bit adder/subtractor.

Accordingly, a preferred embodiment of the present invention will be described with reference to FIG. 1. If input matrix $\underline{X}$ has a dimension of N×N, the 2-D DCT circuit of the present invention comprises a rate buffer 10, two multiplexers 11 and 12, N first registers 13, N/2 summing elements 17, N second registers 14, N parameter extractors 15, N accumulator 16, a pair of truncators 18 and 19, a transpose buffer 20 and an inverse rate buffer 21. The individual building blocks of the 2-D DCT shown in FIG. 1 will now be explained.

Rate buffer 10 has a first data input rate and a second data output rate. That is, elements of input matrix $\underline{X}$ are input to rate buffer 10 at the first rate. Then a rearranged data sequence is output to multiplexer 11 from rate buffer 10 at the second rate. The second rate is preferably two times faster than the first rate. The various data input/output rates can be achieved by providing driving signals of different frequencies at input and output terminals, respectively of rate buffer 10. Therefore, a two-speed transform operation can be achieved by the 2-D DCT circuit of the present invention.

Multiplexers 11 and 12 each provide two data paths for data transmission. A first data path 11a is provided by multiplexer 11 for the rearranged input data sequence from rate buffer 10. This data path is active during a first 1-D DCT process. When the first 1-D DCT process is finished, a second 1-D DCT process begins and a second data path 11b is provided instead of the first data path by multiplexer 11 for transmitting another data sequence from transpose buffer 20.

First registers 13 are connected in series. One of first registers 13 is connected to first multiplexer 11 through port 13a for acquiring data and then sequentially writing the data to a next first register 13. These first registers 13 are 1-word registers whose word length is selected based on the level of precision required for the communication standard on which the DCT circuit is based.

Figure 2:
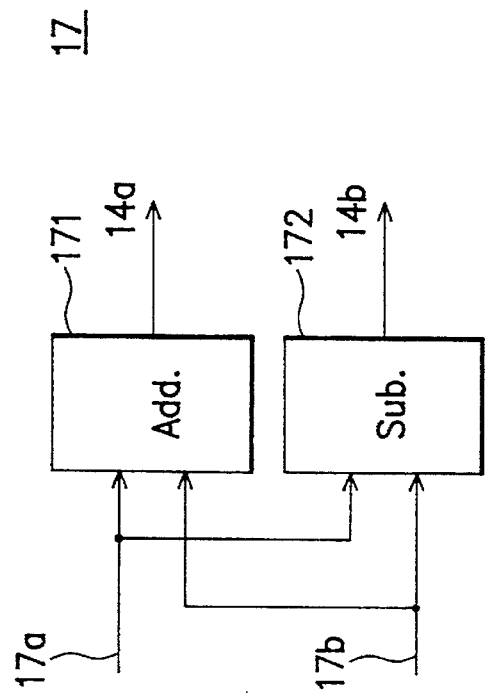
FIG. 2 is a detailed block diagram of Sum block 17 shown in FIG. 1.

As is depicted in FIG. 2, each summing element 17 comprises an adder 171 and a subtractor 172 which have input terminals 17a and 17b respectively. Summing elements 17 are provided for carrying out the adding and subtracting calculation of Eq. (5) and (6), thus obtaining 1-D DCT results at terminals 14a and 14b.

Figure 3:
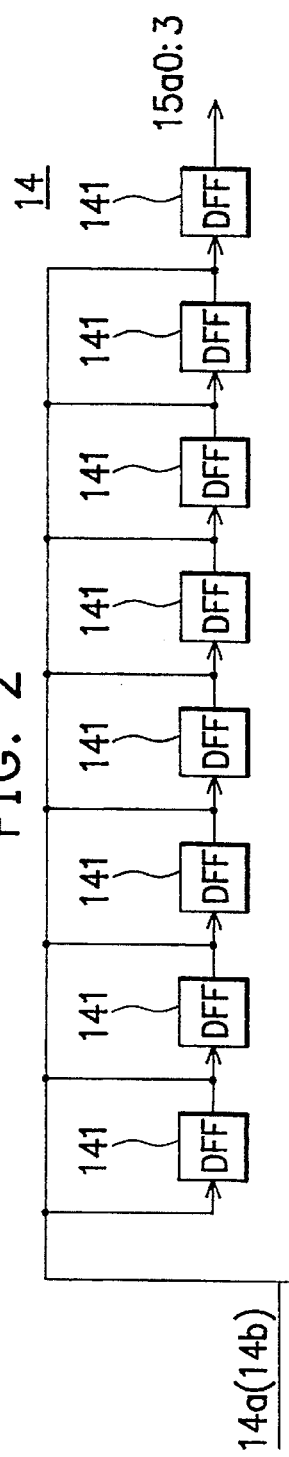
FIG. 3 is a more detailed block diagram of a register 14 shown in FIG. 1.
Figure 3:
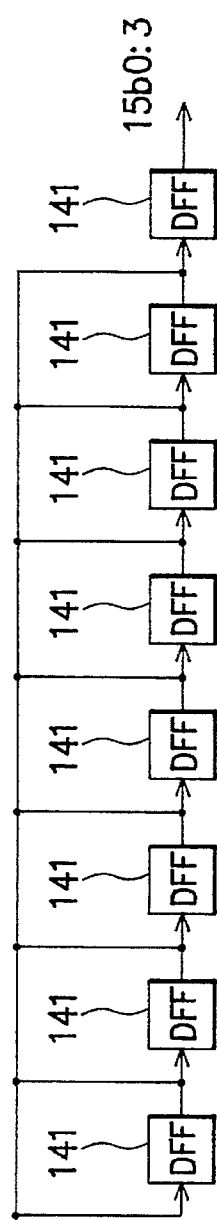

Second registers 14 are also 1-word registers. Second registers 14 have 1-word input data from summing elements 17 through terminals 14a and 14b, while two 1-bit data per clock cycle are output from terminals 15a and 15b respectively. The structure of registers 14 is depicted in FIG. 3, wherein eight 1-bit registers 141 are connected in series to provide an odd-bit data path for terminal 15a, while another eight registers are connected in series to provide an even-bit data path for terminal 15b.

Figure 4:
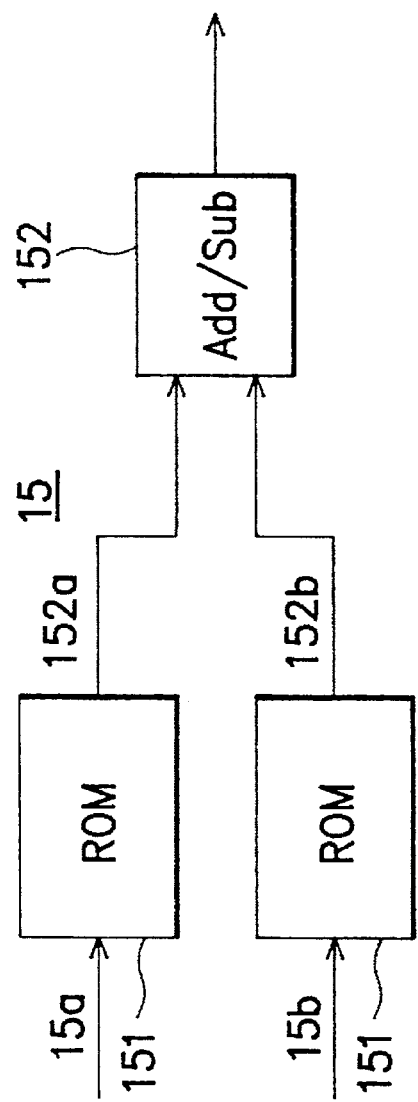
FIG. 4 is a more detailed block diagram of a PE block 15 shown in FIG. 1.

Each parameter extractor 15 comprises two 16-word ROM devices 151 and an adder/subtractor 152, as is depicted in FIG. 4. The word length in parameter extractor 15 is m+n bits. As are defined in Eq. (7), m and n depend on the communication standard that the DCT circuit is based on. Since the input data from terminal 15a is one order less than that from terminal 15b, the parameter extracted from ROM device 151 at terminal 152a must have 1-bit shift to the right prior to adding or subtracting with that at terminal 152b. Only when a sign bit appears at terminal 15b, will a subtracting calculation be performed, or adder/subtractor 152 performs adding calculation general.

Figure 5:
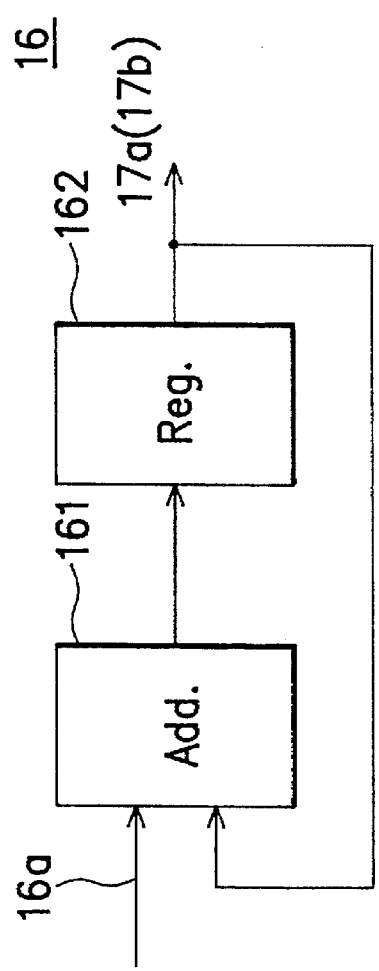
FIG. 5 is a block diagram of an accumulator 16 shown in FIG. 1.

Each accumulator 16, as is depicted in FIG. 5, comprises an adder 161 and a register 162. Accumulation of parameters from parameter extractor 15 is carried out by adder 161 which adds each input data from terminal 16a into the data stored in register 162, thus accumulating data therein.

Truncator 18 is provided for truncating the first 1-D DCT results into m-bit values to simplify the second 1-D DCT process. Truncator 19 is provided for truncating the second 1-D DCT results into 9-bit data to conform the requirements of communication standards.

Transpose buffer 20 has a dimension of N×N (8×8 in the preferred embodiment). The first 1-D DCT results are output from truncator 18 through terminal 20a and stored in transpose buffer 20 during the first 1-D DCT process. The stored data, which is denoted as matrix $\underline{Z}$, is transposed into another data matrix $\underline{Z}^t$. Matrices $\underline{Z}$ and $\underline{Z}^t$ are in 1-D format like that of the sequence from matrix $\underline{X}$, as is stated above. Then during the second 1-D DCT process, matrix $\underline{Z}^t$ is sent to multiplexer 11.

As to inverse rate buffer 21, a data input rate of the second rate and a data output rate of the first rate are required to be in consistence with rate buffer 10. During the second 1-D DCT process, the second 1-D DCT results are output from truncator 19 through terminal 21a and stored in inverse rate buffer 21, and then output through terminal 21b as data matrix $\underline{Y}$ at the first rate. The various data input/output rates can be achieved by providing driving signals of different frequencies at input terminal and output terminal of inverse rate buffer 21.

Figure 6:
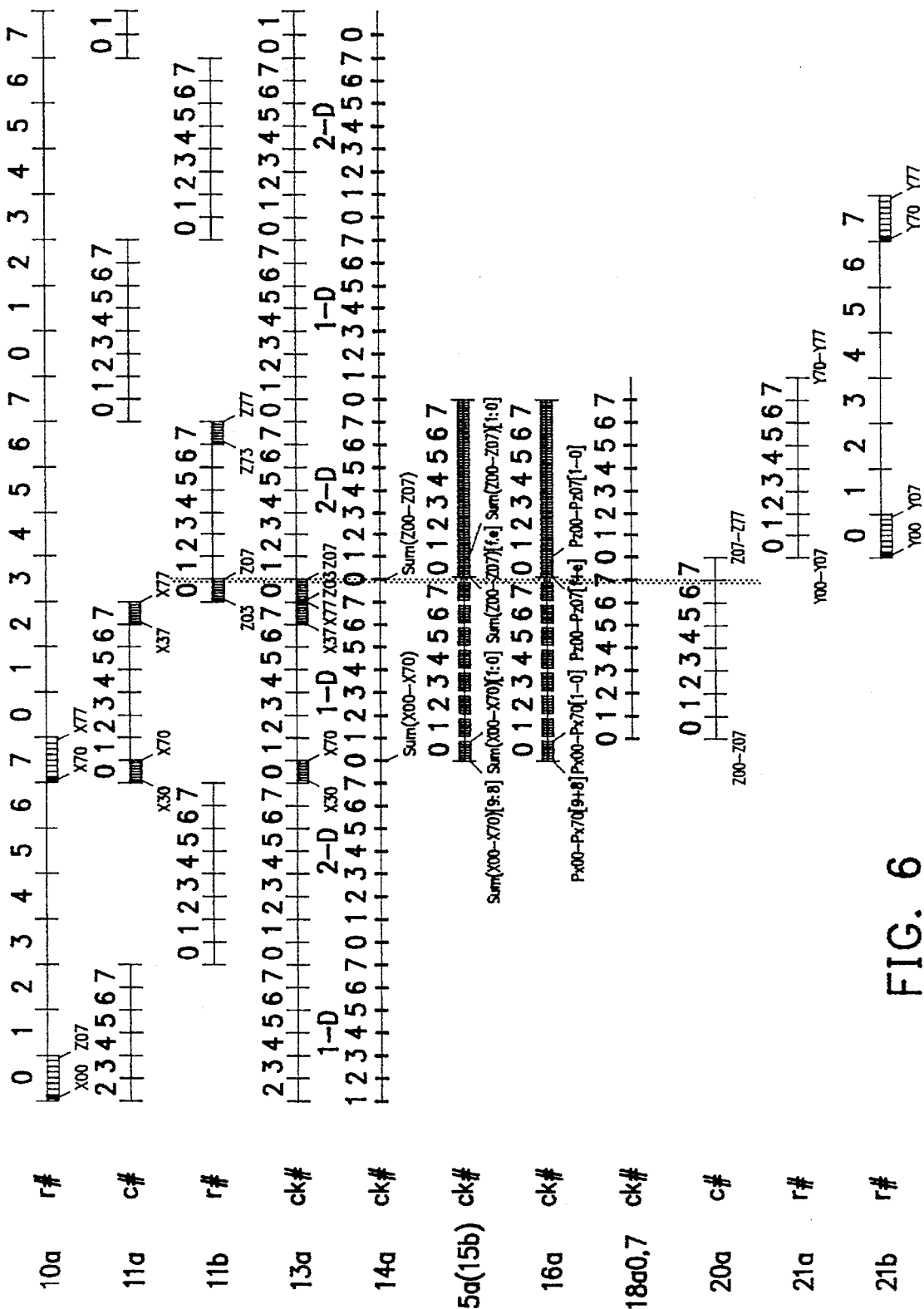
FIG. 6 is a timing diagram illustrating the operation of the circuit in FIG. 1.

The operation of the 2-D DCT circuit of the present invention will be described with reference to the timing diagram shown in FIG. 6. Referring to FIG. 1 and FIG. 6, elements of input data matrix $\underline{X}$ are successively written into rate buffer 10 and stored therein through terminal 10a, in the order of row by row, known as a "raster scan" manner. When the first element of the last row of matrix $\underline{X}$, i.e., element $X_{70}$ in the preferred embodiment, is about to write in rate buffer 10, data stored therein begins to be read out through terminal 11a. Output data of rate buffer 10 is a sequence of $X_{3k}, X_{4k}, X_{2k}, X_{5k}, X_{1k}, X_{6k}, X_{0k}$ and $X_{7k}$, with column number k from 0 to 7, which are different from the input sequence. These data sequences can be observed in the first and second lines of FIG. 6.

During the first 1-D DCT process, i.e., the first 1-D DCT process, multiplexer 11 provides its first data path for input data $X_{ij}$. Therefore, each element of matrix X can be sequentially written into register 13 through rate buffer 10 and multiplexer 11. Whenever eight words of data has been written into register 13, the data is sent to summing elements 17 simultaneously. As shown in FIG. 1, each summing element is connected with two first registers 13, i.e., an odd and an even first register. Data from odd and even first registers are subtracted and added according to Eq. (5) and (6) in summing elements 17. The calculated results of summing elements 17 are outputted to second registers 14 which are separated into two groups for storing subtracting and adding results respectively. Each word stored in register 14 is read out two bits at a time through terminals 15a0:3 and 15b0:3, referring to FIG. 3. Since the weighting of terminals 15a0, 15a1, 15a2 and 15a3 are the same and that of 15b0, 15b1, 15b2 and 15b3 are the same too, there can be two 4-bit buses 15a and 15b formed by the two sets of data output terminals. As mentioned above, data in bus 15b is an order higher than that in bus 15a.

Data in buses 15a and 15b are written into parameter extractor 15 to select corresponding parameters in ROM devices 151. These parameters, as the partial sums of Eq. (10), are summed up in adder 152 and then outputted at terminals 16a.

After accumulating the data of terminals 16a by accumulators 16, transformed results of 4×4 matrices, as shown in Eq. (5) and (6), are obtained. Since the 1-D DCT results may have word length longer than that required for achieving desired data precision, truncator 18 is provided to truncate the 1-D DCT results, thus eliminating circuits for processing the redundant bits. Since only the first m bits of 1-D DCT results are remained, the circuit can be more condensed and the timing is easy to control.

The transformed data from truncator 18, i.e., elements of matrix $\underline{Z}$, are stored and transposed in transpose buffer 20. When the second 1-D DCT process begins, the elements of matrix $\underline{Z}$ are sent to first multiplexer 11 for the second 1-D DCT process. In the preferred embodiment, the second 1-D DCT process begins when the first element of the sixth column of matrix $\underline{Z}$, i.e., $Z_{06}$ is written into transpose buffer 20. The output sequence of transpose buffer 20 is a sequence of $Z_{k3}, Z_{k4}, Z_{k2}, Z_{k5}, Z_{k1}, Z_{k6}, Z_{k0}$ and $Z_{k7}$ with row number k. When element $Z_{07}$ is about to transform in the second 1-D DCT process, depicted as the left dash line of FIG. 7, it is not yet ready to send out from transpose buffer 20. Therefore, a feedback from truncator 18 is provided to directly transmit element $Z_{07}$ to second multiplexer 12 for the second 1-D DCT process. Thus, in general, second multiplexer 12 provides a third data path for the data from first register 13 to second register 14, while during the moment that element $Z_{07}$ is required, a fourth data path is provided by second multiplexer 12 as a short cut.

Operation of the second 1-D DCT process is similar to that of the first 1-D DCT process, except for providing the second data path by first multiplexer 11 for transposed data, i.e., the elements of matrix $\underline{Z}$. When the second 1-D DCT process is successively carried out, output data of the 2-D DCT circuit, i.e., elements of matrix $\underline{Y}$, are generated and truncated by truncator 19, and then written into inverse rate buffer 21. Finally, matrix $\underline{Y}$ is outputted at the second rate from inverse rate buffer 21, as is shown in the last line of FIG. 7.

Through the two-speed operation of the 2-D DCT circuit, a real time transformation can be achieved. Furthermore, as compared with the conventional circuit of FIG. 1, the distributed arithmetic structure including the first and second registers, the parameter extractors, the accumulators and the summing elements is provided in the present invention to replace the function of transformation circuit of the prior art circuit. Since the distributed arithmetic structure utilizes the ROM devices for matrix calculation, the operation efficiency is improved. Moreover, through the various address modes provided by the rate buffer and inverse rate buffer, the wiring between each element can be simplified and the circuit dimension of the present invention can be largely reduced, and the hardware design is much easier. Therefore, the present invention is more suitable for a VLSI implementation.

What is claimed is:

1. An apparatus for real time two-dimensional (2-D) discrete cosine transform (DCT) comprising:
   a rate buffer for inputting an N×N data at a first rate and outputting said data at a second rate;
   a first multiplexer for providing either a first data path or a second data path for data transmission said first data path being provided for said data from said rate buffer during a first 1-D DCT process, while during a second 1-D DCT process, said second data path is provided for a transposed data;
   N first registers connected in series, one of said first registers being connected to said first multiplexer for sequentially writing the data provided by said first multiplexer to a next said first register;
   a second multiplexer for providing either a third data path for data from said first register which is connected to said first multiplexer or a fourth data path for a feedback data;
   N/2 summing elements connected to said first registers for subtracting and adding the data provided by said first registers and said second multiplexer;
   N second registers for storing data from said summing elements;
   N parameter extractors for generating parameters by the data stored in said second registers;
   N accumulators for accumulating as transformed data the parameters of said parameter extractors;
   a transpose buffer for transposing said transformed data from said accumulators; wherein said transposed data is generated by said transpose buffer and is stored therein during said first 1-D DCT process; and
   an inverse rate buffer for acquiring data from said accumulators, during said second 1-D DCT process, at said second rate, and outputting an N×N data at said first rate.

2. The apparatus for 2-D DCT as claimed in claim 1 further comprising a truncator between said accumulators and said transpose buffer for truncating said transformed data.

3. The apparatus for 2-D DCT as claimed in claim 1 further comprising a truncator between said accumulators and said inverse rate buffer for truncating said transformed data.

4. The apparatus for 2-D DCT as claimed in claim 1, wherein said first registers are 1-word registers.

5. The apparatus for 2-D DCT as claimed in claim 1, wherein said second registers are 1-word registers.

6. The apparatus for 2-D DCT as claimed in claim 1, wherein said second registers are formed by 2 sets of N/2 1-bit registers connected in series.

7. The apparatus for 2-D DCT as claimed in claim 1, wherein each said parameter extractor comprises two ROM devices and an adder/subtractor.

8. The apparatus for 2-D DCT as claimed in claim 1, wherein each said accumulator comprises an adder and a register.

9. The apparatus for 2-D DCT as claimed in claim 1, wherein each said summing element comprises an adder and a subtractor.

10. The apparatus for 2-D DCT as claimed in claim 1, wherein said rate buffer is provided with various address modes for data input and output.

11. The apparatus for 2-D DCT as claimed in claim 1, wherein said inverse rate buffer is provided with various address modes for data input and output.

* * * * *